(12) United States Patent
Lafont

(10) Patent No.: US 8,439,300 B2
(45) Date of Patent: May 14, 2013

(54) REAR PART OF AN AIRCRAFT COMPRISING A STRUCTURE FOR SUPPORTING ENGINES, EXTENDING THROUGH THE FUSELAGE AND CONNECTED THERETO BY AT LEAST ONE CONNECTING ROD

(75) Inventor: Laurent Lafont, Pechbusque (FR)

(73) Assignee: Airbus Operations SAS, Toulouse (FR)

( * ) Notice: Subject to any disclaimer, the term of this patent is extended or adjusted under 35 U.S.C. 154(b) by 189 days.

(21) Appl. No.: 13/063,369

(22) PCT Filed: Sep. 16, 2009

(86) PCT No.: PCT/FR2009/051738
§ 371 (c)(1),
(2), (4) Date: May 25, 2011

(87) PCT Pub. No.: WO2010/031958
PCT Pub. Date: Mar. 25, 2010

(65) Prior Publication Data
US 2011/0233326 A1 Sep. 29, 2011

(30) Foreign Application Priority Data

Sep. 18, 2008 (FR) ...................................... 08 56297

(51) Int. Cl.
*B64D 27/00* (2006.01)
(52) U.S. Cl.
USPC ........................................... 244/54; 248/554
(58) Field of Classification Search .................... 244/54, 244/55; 248/554, 555, 556, 557
See application file for complete search history.

(56) References Cited

U.S. PATENT DOCUMENTS

| | | | | |
|---|---|---|---|---|
| 4,044,973 A | * | 8/1977 | Moorehead | 244/54 |
| 4,500,054 A | * | 2/1985 | Osborn | 244/54 |
| 4,821,980 A | * | 4/1989 | Clausen et al. | 244/54 |
| 4,976,396 A | | 12/1990 | Carlson et al. | |
| 5,065,959 A | * | 11/1991 | Bhatia et al. | 244/54 |
| 7,726,602 B2 | * | 6/2010 | Llamas Sandin | 244/54 |
| 7,815,145 B2 | * | 10/2010 | Beardsley | 244/54 |
| 8,016,233 B2 | * | 9/2011 | Moore et al. | 244/119 |
| 2011/0168839 A1 | * | 7/2011 | Porte et al. | 244/1 N |

FOREIGN PATENT DOCUMENTS

| | | |
|---|---|---|
| DE | 961 151 | 4/1957 |
| WO | 98 25821 | 6/1998 |

OTHER PUBLICATIONS

International Search Report issued Jul. 15, 2010 in PCT/FR09/051738 filed Sep. 16, 2009.
U.S. Appl. No. 13/257,628, filed Sep. 20, 2011, Lafont, et al.
U.S. Appl. No. 13/063,080, filed Mar. 9, 2011, Lafont, et al.
U.S. Appl. No. 13/063,302, filed Mar. 10, 2011, Lafont, et al.

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

A rear part of an aircraft, including a support structure for supporting engines, extending through the fuselage, through two openings distributed on either side of a vertical median plane of the aircraft. The support structure includes a first half-structure and a second half-structure respectively extending through the first and second fuselage openings, the first and second half-structures being joined to each other so that they can be disassembled in an inside space defined by the fuselage.

10 Claims, 9 Drawing Sheets

REAR PART OF AN AIRCRAFT COMPRISING A STRUCTURE FOR SUPPORTING ENGINES, EXTENDING THROUGH THE FUSELAGE AND CONNECTED THERETO BY AT LEAST ONE CONNECTING ROD

TECHNICAL FIELD

The present invention generally relates to a rear part of an aircraft, equipped with engines fastened on the fuselage thereof.

BACKGROUND OF THE INVENTION

To make such a rear aircraft part, it has been proposed, in the prior art, to insert an attachment mast between the fuselage and each engine. In that configuration, the mast is fixed directly on the fuselage. To ensure a satisfactory transfer of motive force towards the fuselage, significant dimensioning is necessary for the mast, the part of the fuselage supporting it, and the fastening means inserted between those elements. This amounts to drag, which penalizes the overall aerodynamic performance of the aircraft.

Another solution consists of providing a support structure for the engines going through the fuselage, as well as the inside space of the aircraft defined by said fuselage. At the level of its passage through the two fuselage openings, the through structure is spliced to the fuselage using a plurality of bolts or similar fastening members.

Nevertheless, although this solution makes it possible, relative to the solution described above, to slightly reduce the intensity of the efforts introduced into the fuselage at each of the two openings, in particular the efforts oriented along the direction of the support structure, it has a non-negligible drawback. Indeed, its assembly and disassembly are difficult to carry out, primarily due to the need to pass through the two opposite openings of the fuselage with the same support structure for supporting the engines.

BRIEF DESCRIPTION OF THE INVENTION

The invention therefore aims to propose a rear part of an aircraft at least partially resolving the aforementioned drawback, relative to the embodiments of the prior art.

To that end, the invention relates to a rear part of an aircraft comprising:
  a fuselage delimiting an inside space of the aircraft;
  at least two engines;
  a support structure for the engines, passing through said fuselage at first and second openings formed therein and distributed on either side of a vertical middle plane of the aircraft, said support structure having first and second opposite ends;
  each of said first and second opposite ends of the support structure protruding outwardly from the fuselage, on either side of said vertical middle plane, respectively, and supporting one of said engines.

According to the invention, said support structure is made from first and second half-structures respectively extending through said first and second openings of the fuselage, said first and second half-structures being assembled to each other so that they can be disassembled within said inside space.

Thus, the original design proposed by the present invention makes it possible to greatly facilitate the assembly and disassembly operations of the support structure of the engines, since it is currently done from two separate half-structures, assembled to each other reversibly. Each of these two half-structures can thus be manipulated independently of the other during an assembly/disassembly, making the work easier for operators. In particular, each support half-structure only requires going through a single fuselage opening, advantageously involving a noticeable simplification for the operators, both during the initial assembly and during replacement of the support structure.

Moreover, during an assembly operation, each half-structure can be equipped, at its end, with its engine, before being inserted into its corresponding fuselage opening, to then be assembled to the other half-structure. This still further simplifies the assembly method relative to that previously used with the single structure solution, since with the latter, the assembly of the engines on that structure was possible only after placing that structure on the fuselage.

Naturally, this last advantage is also observed during an operation to disassemble the support structure from the engines, given that each engine can be placed while remaining attached to its associated support half-structure.

Lastly, as will be detailed below, another advantage following from the embodiment in two half-structures lies in the possibility of tilting them relative to each other, when viewed from the front.

Preferably, said first half-structure has an inner end opposite said first end, said second half-structure has an inner end opposite said second end, and said two inner ends are assembled to each other such that they can be disassembled within said inside space, via connecting means passed through by said vertical middle plane. In this scenario, the two support half-structures are preferably arranged symmetrically relative to the vertical middle plane in which they are connected. Nevertheless, the two half-structures could be connected in another plane, without going beyond the scope of the invention.

Preferably, said connecting means are bolts and/or shearing pins.

Preferably, said first and second half-structures extend, viewed from the front, substantially along first and second directions, respectively, inclined relative to each other, so as to substantially form a V. In such a case, the tip of the V may or may not be arranged on the longitudinal axis of the aircraft. In one preferred embodiment of the invention, the V is oriented with its tip pointed downwards, and arranged above the longitudinal axis of the aircraft.

More generally, it is then preferably provided that said V has said vertical middle plane as plane of symmetry.

Moreover, it is preferably for said support structure to be designed so that viewed from the front, for each half-structure:
  an acute angle (v) between a horizontal middle plane of the fuselage, and a line connecting a longitudinal central axis of the fuselage and the longitudinal axis of the engine, is greater than 25°; and
  an acute angle (w) between the direction in which said half-structure extends, and the direction normal to the fuselage at the passage of said half-structure, is smaller than 20°.

Because configuration offers freedom in positioning the tip of the V as well as freedom in setting the value of the angle of said V, it is in fact possible, when the angle (v) is set, to adapt the two aforementioned parameters of V in order to obtain a satisfactory angle (w), i.e. with a low enough value not to create overly significant aerodynamic disruptions. As a reminder, in the solutions of the prior art with a single support structure arranged horizontally, the angle (v) is not only limited by the height of the fuselage, but furthermore, the angle (w) is larger as the angle (v) is large. This is restrictive in that an overly large angle (w), reflecting a close proximity between the fuselage and the support structure, leads to implanting an aerodynamic fairing between them dedicated to minimizing aerodynamic disruptions. Thus, the aforementioned V configuration advantageously makes it possible, by reducing the angle (w), to do away with the presence of this additional fairing, given that the aerodynamic disruptions are no longer critical. Generally, it becomes possible to optimize the angle (w) using an aerodynamic criterion, and in particular to avoid the penalties associated with the presence of an aerodynamic fairing of the "Karman" type.

Preferably, said first half-structure is connected to a first casing forming said first fuselage opening via first fastening means, and said second half-structure is connected to a second casing forming said second fuselage opening via second fastening means.

Preferably, said first and second fastening means each comprise at least one flexible fastener. This type of fastener, for example made with one or several damping members, such as members made from an elastically deformable polymer material, e.g. of the elastomer or rubber type, advantageously makes it possible to damp the vibrations and therefore participates in insulating, from a vibration perspective, the fuselage from the engine. Furthermore, the low level of force encountered, and well as the low surrounding temperature due to the distance from the engine, constitute two criteria favorable to the placement of such damping members. Lastly, the presence of these damping members makes it possible to eliminate, during assembly operations, the potential tolerance problems inherent to the hyperstaticity of the assembly, when such hyperstaticity is provided.

Alternatively, other damping members of the spring type can be used.

Preferably, said first and second half-structures each generally assume the form of a beam.

The means for fastening the support structure for the engines on the fuselage comprise not only the aforementioned first and second fastening means, but also preferably at least one effort recovery connecting rod whereof a first end is mounted on said support structure, and the opposite end of which is mounted on the fuselage, away from the first and second openings.

Thus, this advantageously makes it possible to minimize the intensity of the forces passing through the fuselage opening casings, allowing the latter to have smaller dimensions than those previously seen. Indeed, part of the forces coming from the engine and oriented towards the fuselage no longer uses the opening casings of the fuselage, but passes through the aforementioned connecting rods, the first aim of which is therefore to introduce motive forces at points of the fuselage spaced away from the openings. The concentration of stresses within the opening casings of the fuselage is therefore substantially minimized.

Moreover, to minimize the concentration of stresses within the support structure of the engines, at the fuselage openings, it is preferably done so that the first connecting rod end is also mounted on that support structure, away from the openings. The structure less locally stressed can thus have smaller dimensions, for non-negligible mass savings.

Preferably, said effort recovery connecting rod is inclined relative to a vertical direction of the aircraft, seen along a longitudinal direction thereof. This allows it to transfer forces in a direction whereof at least one component is oriented in the transverse direction of the aircraft. These transverse forces are in fact the most difficult to recover with the first and second fastening means housed in the fuselage openings, so that the aforementioned orientation of said connecting rod responds to a real issue.

Preferably, two effort recovery connecting rods are provided, arranged symmetrically relative to said vertical middle plane of the aircraft. The symmetry achieved advantageously allows a certain compensation in the recovery of the motive forces passing through the connecting rods, which are preferably arranged in a transverse plane of the aircraft, but could alternatively be inclined relative to such a plane. Moreover, more than two of them could be provided without going beyond the scope of the invention.

Preferably, said support structure substantially forms a V, and said two effort recovery connecting rods together substantially form an upside-down V relative to that of said support structure.

Preferably, said opposite ends of the two connecting rods are mounted substantially at a same point on the fuselage, said point belonging to said vertical middle plane of the aircraft. Naturally, they may be mounted at two distinct points of the fuselage, without going beyond the scope of the invention.

Preferably, each effort recovery connecting rod is mounted articulated at its ends.

Preferably, each effort recovery connecting rod is mounted above said support structure, although an opposite situation could also be contemplated.

Moreover, it is possible for the first fastening means to comprise at least one blocking element for said support structure, under compression loading while bearing on one hand on said first casing, and on the other hand on said support structure, and for said second fastening means to comprise at least one blocking element for said support structure, under compression loading while bearing on one hand on said second casing, and on the other hand on said support structure.

In this configuration, the first and second fastening means are at least partially formed using blocking elements that work in compression, and no longer in traction as was the case in the traditional elements of the prior art, of the bolt type or a similar type.

This advantageously results in an ease of placement of these blocking elements, because the latter can be situated entirely in the fuselage openings, without having to pass through the casings or the support structures for supporting the engines. Moreover, these blocking elements can have a reduced mass and cost, and above all remain only slightly or not at all sensitive to fatigue stresses, thereby ensuring them a longer lifespan compared to that of the fastening means previously encountered.

Preferably, each of said first and second fastening means comprises at least two blocking elements of said support structure, under compression loading respectively in two distinct directions, for example substantially orthogonal to each other.

Generally, each blocking element under compression loading exerts a force on a given face of the structure, which leads the face opposite that given face to bear on the face of the casing opposite it. Thus, for each opening, when blocking elements under compression loading along two separate directions are provided, respectively, in the middle opening plane, this is sufficient to maintain the structure relative to the opening casing, in all directions of that middle plane of the fuselage opening.

It should be noted that the bearing between the casing and said opposite face of the support structure can be with or without direct contact, damping means for example being able to be inserted between those two elements.

Indeed, preferably, each blocking member bears on said support structure and/or on its associated casing, via a damping member. This advantageously makes it possible to procure, as mentioned above, a certain flexibility for the first and second fastening means, reducing the vibrations in the fuselage. In other words, the damping members, preferably made from an elastically deformable polymer material, for example of the elastomer or rubber type, advantageously make it possible to damp the vibrations, and therefore participate in insulating, from a vibration perspective, the fuselage from the engine. Here again, alternatively, other damping members of the spring type can be used.

Preferably, each blocking element has means for adjusting the spacing between its two bearing surfaces respectively bearing on the support structure and on the concerned casing. This functionality makes it possible not only to facilitate the placement of these blocking elements in the opening, but also to apply a compression pre-stress to them with a desired value.

Preferably, each blocking element assumes the form of a compression rod supporting two opposite bearing surfaces.

Preferably, each of said first and second fastening means comprises blocking elements bearing on at least two faces of said support structure, as well as at least one secondary damping member inserted between another face of said support structure, and said concerned secondary casing. Preferably, each secondary damping member is of a nature identical or similar to that of the damping members described above, intended to equip the blocking elements.

Still more preferably, said support structure and said first and second casings each have four faces substantially forming a quadrilateral in section along the associated middle opening plane, each of said first and second fastening means comprises blocking elements bearing on two attached faces of said support structure, as well as secondary damping members inserted between the other two attached faces of said support structure, and said concerned casing.

The secondary damping members make it so there is no direct contact between the support structure and the casings, even if such direct contacts could be contemplated, without going beyond the scope of the invention. When such damping members and secondary damping members are not provided, a so-called rigid assembly is then obtained between the support structure and the casings.

Moreover, in the preferred contrary case where damping members and secondary damping members are provided, it is preferably done such that some or each of these members can compress only over a limited crushing travel, beyond which a rigid contact between the structure and the casing prohibits the continuation of the crushing.

The invention also relates to a method for assembling a rear part of an aircraft as described above, comprising the following steps:
- placing said first half-structure, by moving it aiming to make it pass through said first opening of the fuselage with its inner end placed towards the front in the direction of movement;
- placing said second half-structure, by moving it aiming to make it pass through said second fuselage opening with the inner end thereof placed towards the front in the direction of movement; and
- assembling the inner end of the first half-structure on the inner end of said second half-structure.

Other features and advantages of the invention will appear in the non-limiting detailed description below.

BRIEF DESCRIPTION OF THE DRAWINGS

This description will be done in light of the appended drawings, in which.

DETAILED DESCRIPTION OF THE INVENTION

Figure 1:
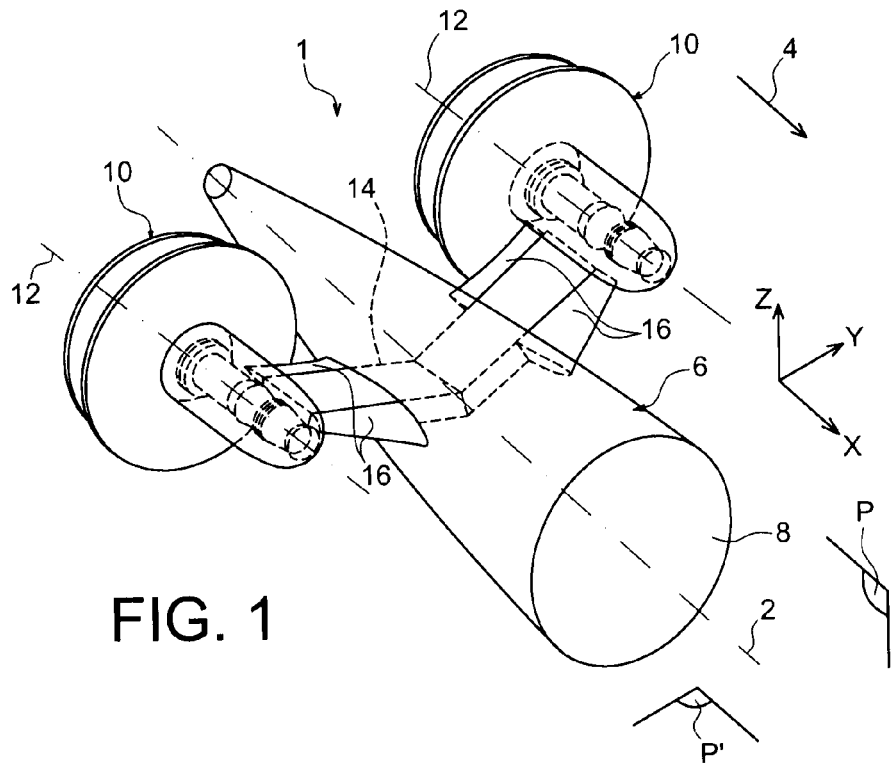
FIG. 1 shows a diagrammatic perspective view of a rear portion of the aircraft, according to one preferred embodiment of the present invention.

FIG. 1 shows a rear part 1 of an aircraft assuming the form of one preferred embodiment of the present invention.

In all of the following description, by convention, X refers to the longitudinal direction of the aircraft, which is parallel to a longitudinal axis 2 of that aircraft. Y refers to the direction oriented transversely relative to the aircraft, and Z refers to the vertical direction or the height, these three directions X, Y and Z being orthogonal to each other.

Moreover, the terms "front" and "rear" should be considered relative to a direction of forward motion of the aircraft encountered after the thrust exerted by the engines, this direction being shown diagrammatically by arrow 4.

Overall, the rear part 1 comprises a fuselage 6, with a substantially circular, elliptical or similar transverse section, with a center passing through the longitudinal axis 2, and delimiting an inside space of the aircraft 8.

Furthermore, it comprises at least two engines 10 arranged on either side of a vertical middle plane P passing through the axis 2. In the preferred embodiment, two engines 10 are provided, one on either side of the fuselage 6, these engines being able to indifferently be of the turbojet engine, turboprop, or other type. Each of these has a longitudinal axis 12 substantially parallel to direction X.

To ensure the suspension of these engines, a support structure 14 is provided, preferably arranged in a transverse plane, and which has the particularity of passing through the inside space 8 as well as the fuselage at two openings thereof. The portions of this structure 14 that are laterally spaced away from the plane P, and that protrude outwardly from the fuselage, are covered with aerodynamic fairings 16, as shown in FIG. 1.

Figure 2:
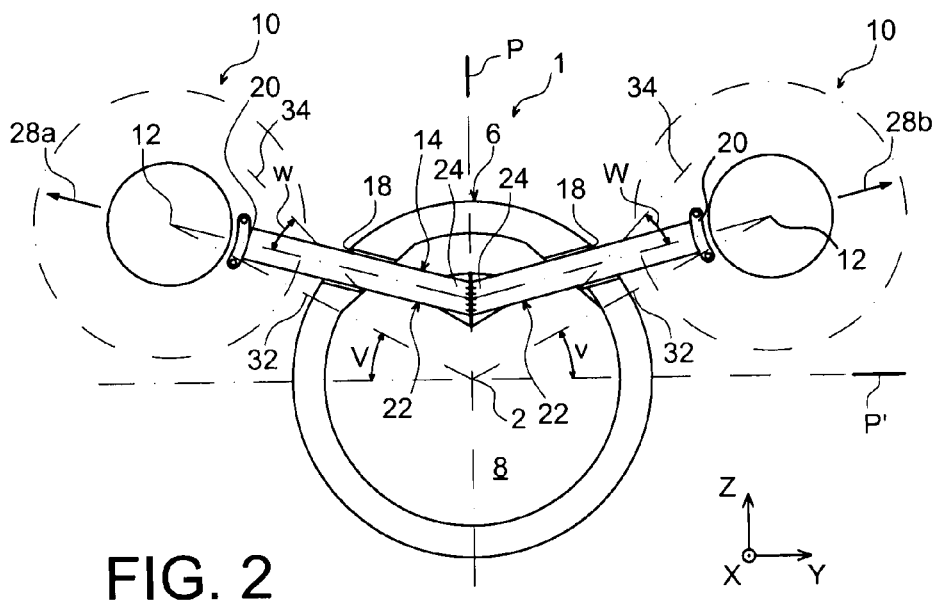
FIG. 2 shows a more detailed view in transverse cross-section of the rear part of the aircraft shown in FIG. 1, the means for fastening the support structure of the engines on the fuselage having intentionally been omitted.

More precisely, in reference to FIG. 2, one can see that the support structure 14 passes through the fuselage 6 at first and second openings formed therein, both referenced 18. These two openings are distributed on either side of the vertical middle plane P, and arranged symmetrically relative to the latter, which also substantially constitutes a plane of symmetry for the entire rear part of the aircraft.

The support structure 14 has first and second opposite ends, both referenced 20, each protruding outwardly from the fuselage, respectively on either side of the plane P, and supporting one of the engines 10.

Each end 20 can thus be likened to a rigid attachment mast 4 structure, for example with a design identical or similar to those known from the prior art to suspend an engine under a wing, and therefore ensuring the transfer of motive forces towards the structure of the aircraft.

One of the particularities of the present invention lies in the design of the support structure 14 of the engines. Indeed, said structure is made from first and second half-structures, both referenced 22, and respectively passing through the first and second openings of the fuselage 18, 18, respectively.

Moreover, they are assembled to each other so that they can be disassembled within the inside space 8. To that end, the first half-structure 22 has an inner end 24 opposite the first end 20, and the second half-structure 22 has another inner end 24 opposite the second end 20, the two inner ends 24, 24 therefore being in contact and assembled to each other so that they can be disassembled within the inside space 8, for example using bolts and/or shearing pins (not shown).

Preferably, the junction between the two half-structures 22, 22 is done at the plane P in which the fastening interface is located, the bolts and/or pins thereby being passed through by the plane P. In general, this plane P constitutes a plane of symmetry for the support structure of the engines 14, which, seen from the front as shown in FIG. 2, is substantially V-shaped.

Indeed, the first half-structure 22, considered to be the left in FIG. 2, is inclined relative to the direction Y going towards the top moving away from the plane P, like the second half-structure 22, considered that on the right in FIG. 2, is also inclined relative to the direction Y going towards the top moving away from the plane P. The first half-structure 22 therefore extends along a first direction 28a inclined relative to directions Y and Z in a transverse plane, while the second half-structure 22 extends along a second direction 28b also inclined relative to directions Y ad Z in the same transverse plane.

Each half-structure 22, 22 assumes the form of a beam or a box extending substantially rectilinearly in its associated direction 28a, 28b, from its inner end 24 arranged in the plane P, to its opposite end 20, 20 supporting one of the engines 10.

In the preferred embodiment, the V formed by the structure 14 opens upwards, and its tip is arranged above the longitudinal axis 2. The positioning freedom of the tip of the V as well as the freedom to set the value of the angle of the V make it possible to best adapt to the different existing stresses, and in particular makes it possible to best limit the aerodynamic disruptions encountered at the outer partitions of the half-structures 22, 22.

Indeed, the support structure is designed so that seen from the front, for each half-structure:

an acute angle (v) between a horizontal middle plane of the fuselage P', and a line 32 connecting the axis 2 of the fuselage and the longitudinal axis 12 of the engine, is greater than 25°; and an acute angle (w) between the direction 28a, 28b along which said half-structure extends, and the direction 34 normal to the fuselage at the passage of said half-structure, is smaller than 20°.

This relatively significant value of the angle (v) makes it possible to arrange the engines at the desired height relative to the fuselage, with for example the engine axes 12 situated in a horizontal plane close to an upper end of the fuselage, while the relatively small value of the angle (w), translating a spacing between the fuselage and each half-structure, makes it possible to do away with the presence of an additional aerodynamic fairing.

Figure 2A:
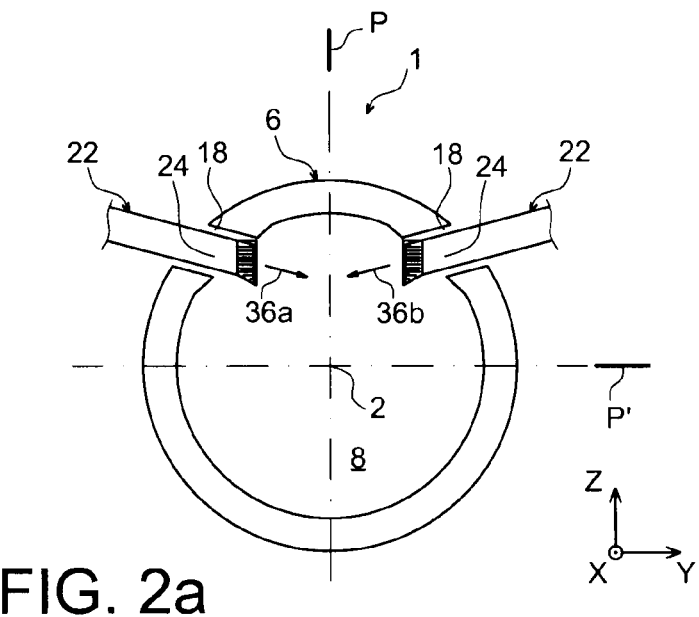
FIG. 2a diagrams the assembly method for the rear part shown in the preceding figures.

The design described above allows an easy assembly and disassembly of the support structure 14. Indeed, in reference to FIG. 2a diagramming a method for assembling the rear part of the aircraft 1, it can be seen that this method includes the step for placing the first half-structure 22, by movement thereof aiming to make it pass through the first fuselage opening 18 with its inner end 24 placed towards the front in the direction of movement 36a, corresponding for example to the first direction 28a in which said first half-structure extends once installed.

Simultaneously or successively, a step is implemented for placing the second half-structure 22, by movement thereof aiming to make it pass through the second fuselage opening 18 with its inner end 24 placed towards the front in the direction of movement 36b, corresponding for example to the second direction 28b wherein this second half-structure extends once installed.

During each of these two steps, the engine 10 can already be installed on the outer end 20 (not shown in FIG. 2a), in order to simplify and shorten the assembly method.

Moreover, it is done so that the inner ends 24, 24 are dimensioned to pass through their respective fuselage openings 18, 18, preferably even while being equipped with their reinforcing means dedicated to the assembly of the two half-structures, such as ribs or similar means. Alternatively, these reinforcing means can be mounted on the inner ends 24, 24 only after they have passed through the openings 18, 18.

In general, it is provided that in a middle opening plane, the ratio between the height of the opening and the height of a half-structure, is between 1.3 and 2. Moreover, in this same plane, the ratio between the depth of the opening and the depth of a half-structure, in direction X, is between 1.1 and 1.5.

Then, the inner end 24 of the first half-structure 22 is assembled on the inner end 24 of said second half-structure 22, using the aforementioned connecting means, which are preferably oriented along direction Y.

Fastening means are provided between the fuselage and the support structure of the engines.

Figure 3:
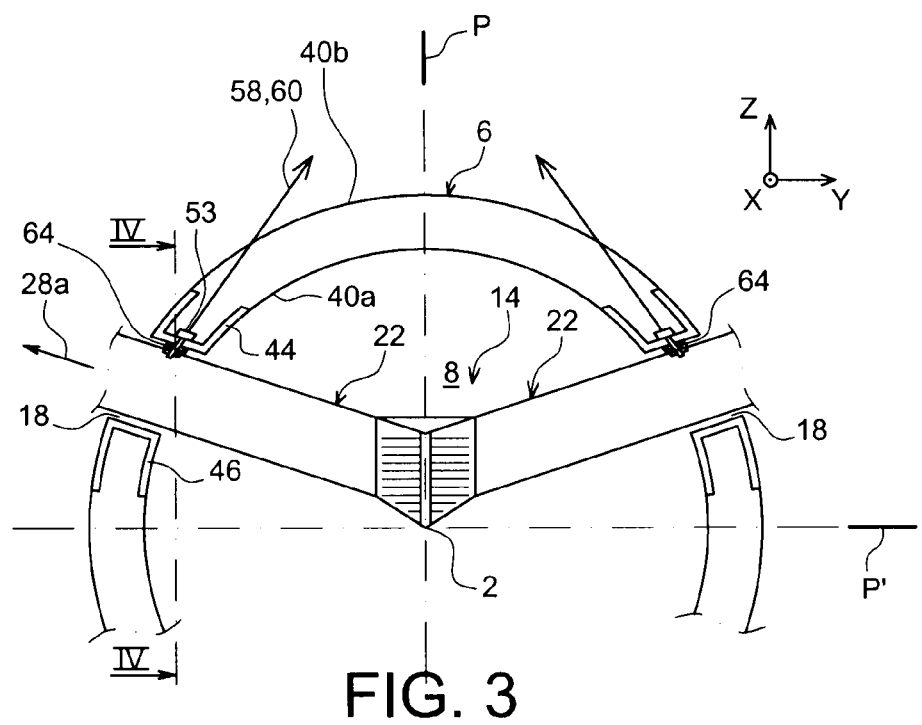
FIG. 3 illustrates a view similar to that of FIG. 2, in which first and second fastening means have been shown for fastening the support structure of the engines on the casings forming the fuselage openings, said first and second fastening means assuming the form of a first embodiment, this figure also corresponding to a cross-sectional view taken along vertical line III-III of FIG. 4.
Figure 4:
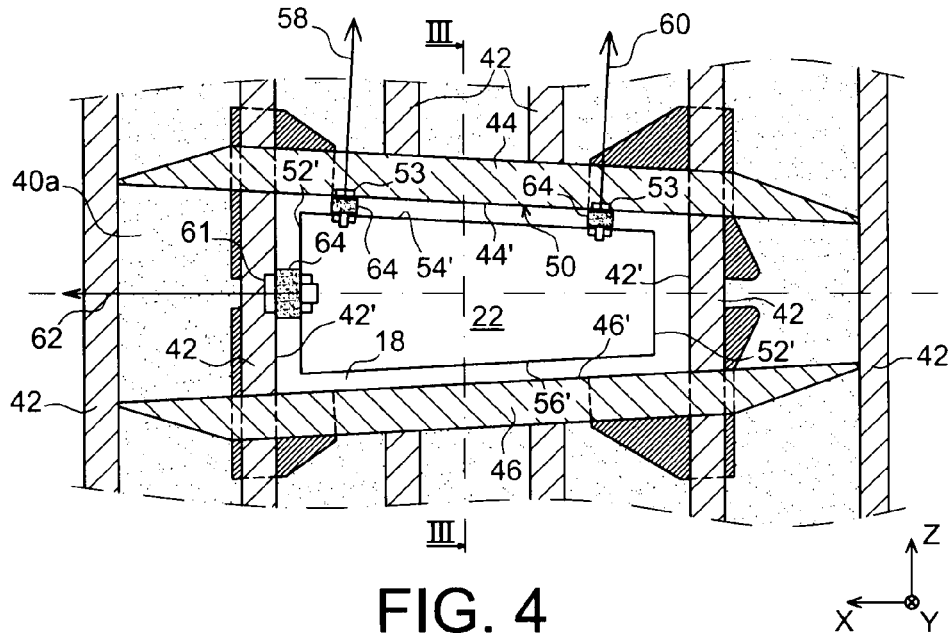
FIG. 4 shows a cross-sectional view along vertical line IV-IV of FIG. 3.

A first preferred embodiment is shown in FIGS. 3 and 4.

These means comprise first fastening means connecting the first half-structure to a first casing forming the first fuselage opening, as well as second fastening means connecting the second half-structure to a second casing forming the second fuselage opening. The first and second fastening means having a substantially identical design, and symmetrical relative to the plane P, only the first means will be described below.

First, it is noted that the first opening 18, with a design identical or similar to that of the second opening 18, is made using a passage in the inner fuselage skin 40a, and another opposite passage, in the outer fuselage skin 40b. These two passages respectively form the inlet of the opening 18, and the outlet of that same opening.

The opening is delimited towards the front by a front fuselage frame 42, and towards the back by another rear fuselage frame 42. As shown in FIG. 4, other fuselage frames 42 situated between the two aforementioned ones can be cut to reveal the opening 18. Moreover, the opening is upwardly delimited by an upper closing crosspiece 44, which preferably extends in direction X over the entire thickness of the fuselage, and which connects the two front and rear fuselage frames 42, 42. Likewise, the opening 18 is downwardly delimited by a lower closing crosspiece 46, which preferably extends in direction X over the entire thickness of the fuselage, and which connects the two front and rear fuselage frames 42, 42. The four elements 42, 42, 44, 46 together form the first casing 50 defining the opening 18.

Thus, in the vertical plane defined by line IV-IV of FIG. 3, as in the middle opening plane, which can be likened to the plane orthogonal to the half-structure 22 and passing through the opening substantially at the middle thereof between its inlet and its outlet, the casing 50 assumes the form of a quadrilateral using its four faces 42', 42', 44', 46' respectively defined by the aforementioned elements 42, 42, 44, 46. In these same planes, the four faces of the half-structure 22 also form a quadrilateral, with the faces of the half-structure and the opening being opposite two by two. As a result, the front face 52' of the half-structure is opposite the front face 42' of the casing, the rear face 52' of the half-structure is opposite the rear face 42' of the casing, the upper face 54' of the half-structure is opposite the upper face 44' of the casing, and the lower face 56' of the half-structure is opposite the lower face 46' of the casing.

The first fastening means, ensuring the assembly of the first half-structure 22 on the first casing 50, first include a plurality of bolts 53 substantially orthogonal to the direction 28a of the half-structure 22 and arranged in planes YZ, allowing the upper face 54' to be hooked on the upper face 44' of the casing. Thus, one or several bolts arranged in rows are provided at two different locations of the half-structure 22, spaced apart along direction X. This makes it possible to ensure the recovery of the efforts along the direction orthogonal to the direction 28a, in planes YZ, as diagrammed by the two arrows 58, 60. In other words, these bolts 53 make it possible to recover efforts in the middle opening plane or in a plane parallel thereto.

Similarly, the first fastening means include one or a plurality of bolts 61 substantially orthogonal to the direction 28a of the half-structure 22 and arranged in one or several planes XZ, allowing the front face 52' to be hooked on the front face 42' of the casing. Thus, preferably a bolt 61 is provided on the half-structure 22, making it possible to ensure the recovery of the efforts along a direction orthogonal to the direction 28a, in a plane XZ, as diagrammed by arrow 62 in FIG. 4. In other words, this bolt 61 also makes it possible to recover efforts in the middle opening plane or in a plane parallel thereto, and more preferably to recover efforts in the direction X in which the bolt 61 extends.

Alternatively, it could be possible to press the half-structure 22 on the casing 50 in another way than on the front 42' and upper 44' faces thereof. It is in fact preferably sought to press said half-structure 22 on two attached faces of the casing, which could therefore, according to one alternative among others, be the lower face 46' and the rear face 42'.

Each bolt 53, 61, or row of bolts, is preferably provided to form a flexible fastener.

This is for example done with one or several damping members, such as members made from an elastically deformable polymer material, e.g. of the elastomer or rubber type, making it possible to damp the vibrations and therefore participating in insulating, from a vibration perspective, the fuselage from the engine. This damping member here preferably assumes the form of an elastomer block 64 compressed between the faces assembled two by two 42', 52' and 44', 54', the compression resulting from the traction effort introduced into the bolt 53, 61 passing through said block, due to the tightening effort. Nevertheless, while this solution is preferred due to the vibration damping properties it procures, one could alternatively consider a rigid and direct contact between the faces assembled two by two 42', 52' and 44', 54', without going beyond the scope of the invention.

Figure 5:
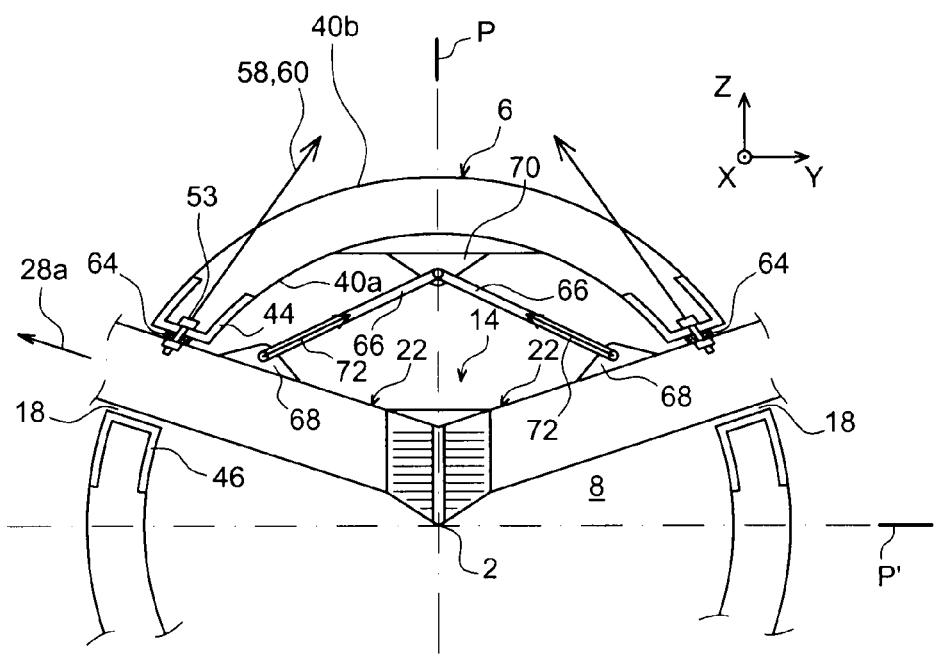
FIG. 5 shows a view similar to that of FIG. 3, in which the fastening means for fastening the support structure supporting the engines on the fuselage are completed by at least one effort recovery connecting rod.

FIG. 5 shows a preferred embodiment similar to the one just described in reference to FIGS. 3 and 4, in that the same first and second fastening means are used. Nevertheless, the means for fastening the half-structure 22 on the fuselage 6 are completed by the presence of one or several effort recovery connecting rods. This globally makes it possible to minimize the intensity of the efforts passing through the opening casings 50, allowing the latter to have smaller dimensions than that previously encountered.

In the illustrated embodiment, two connecting rods 66 are provided arranged symmetrically relative to the plane P, each of these connecting rods having a first end, or lower end, shown in the support half-structure 22, and whereof the opposite end, or upper end, is mounted on the fuselage away from the openings 18.

Due to the symmetry adopted, only the left connecting rod 66 in FIG. 5, i.e. the one that completes the first fastening means, will be described.

To minimize the concentration of stresses within the support half-structure 22, at the opening 18, it is preferably done so that the first connecting rod end is also mounted on this support structure away from the openings, preferably therefore within the inside space 8. This first end 8 is preferably mounted articulated on the half-structure 22, for example using a fitting 68 integral therewith.

It then extends while coming closer to the vertical middle plane P, in which its opposite end is mounted on the fuselage, preferably on an upper portion thereof as shown. Here again, the connection is preferably of the articulated type, using a fitting 70 or fuselage frame extension protruding towards the inside space.

The two effort recovery connecting rods, which are preferably arranged in a transverse plane and the opposite ends of which are mounted substantially at a same point of the plane P on the fuselage, together substantially form an upside-down V relative to that of the support structure 14.

Nevertheless, the position and the orientation of the connecting rods can be modified according to the needs encountered. In that respect, the connecting rods could be arranged below the structure 14, and not above it as shown.

In general, preferably each effort recovery connecting rod 66 is inclined relative to direction Z, seen along direction X like in FIG. 5. This allows it to transfer efforts along a direction whereof at least one component is oriented along direction Y, these transverse efforts in fact being the most difficult to recover with the first fastening means housed in the fuselage opening 18.

In the illustrated embodiment, each connecting rod 66 is substantially inclined relative to directions Y and Z, so as to rise as it goes towards the inside. The efforts then being exerted in these two connecting rod directions, diagrammed by the two arrows 72 of FIG. 5, can therefore be completely recovered by the fastening means. Nevertheless, one alternative solution, among others, would be to orient each connecting rod 66 along direction Y, without going beyond the scope of the invention.

Several connecting rods 66, like those shown in FIG. 5, can be provided between the support structure 14 and the fuselage 6, their number therefore not being limited to one or two. Moreover, one or several of them can each be replaced by a damping jack (not shown), capable of damping/filtering the vibrations able to be transmitted to the fuselage.

Figure 5A:
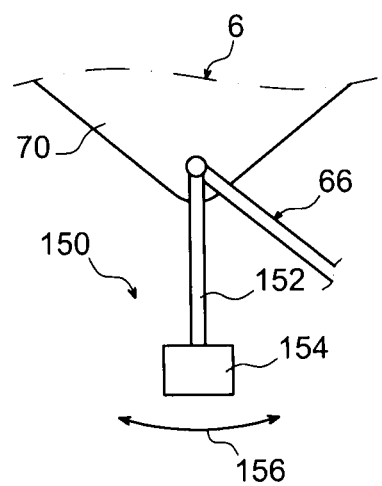
FIG. 5a shows a first alternative of the configuration shown in FIG. 5.

Still with the same aim of damping/filtering the vibrations able to be transmitted by the connecting rods 66 to the fuselage, it is possible to equip at least one of them with a resonator, an example of which is shown in FIG. 5a. In that figure, the resonator equips the end of the connecting rod that is connected to the fitting 70 of the fuselage 6. The resonator 150, extending vertically, includes a beater 152 connected to that connecting rod end by one of its ends, while its other end supports a mass 154. The damping of the vibrations transmitted to the fuselage by the connecting rod is done by an oscillating movement in the mass 154 around the hinge pin of the connecting rod on the fitting 70 of the fuselage, i.e. the hinge pin of the beater on the fitting 70, as diagrammatically shown by arrow 156 of FIG. 5a.

Figure 5B:
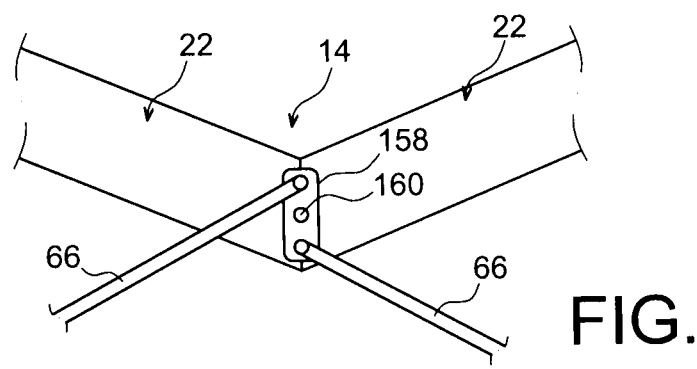
FIG. 5b shows a second alternative of the configuration shown in FIG. 5.

Moreover, as mentioned above, the arrangement of the connecting rods 66 can be adapted according to the needs and constraints encountered. In FIG. 5b, the two connecting rods 66 each have an outer end (not shown) fastened, preferably articulated, on the fuselage, preferably on the lateral portion thereof, and an inner end fastened, articulated, on a plate 158, itself articulated on the support structure 14, preferably in the middle thereof. Thus, the inner ends of the two connecting rods 66 being connected on either side of the hinge pin 160 of the plate, preferably oriented in direction X, the efforts introduced by each of the connecting rods 66 can therefore be balanced. Moreover, this addition of a plate greatly facilitates assembly, given that it eliminates the degree of hyperstatism brought by the configuration with two connecting rods. Although this is not limiting, FIG. 5b shows a configuration in which the V formed by the two connecting rods 66 is open downwardly, and globally arranged below the support structure 14.

Alternatively, the plate 158 connecting the two connecting rod ends could be articulated on the fuselage and not the support structure, for example on the fuselage fitting 70 described relative to FIG. 5.

Figure 6:
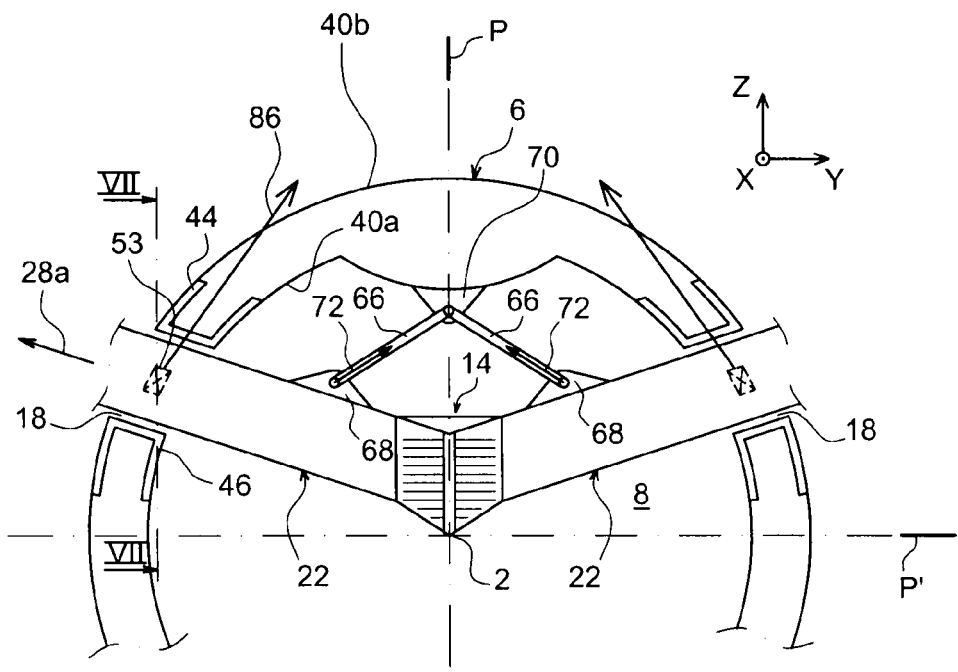
FIG. 6 shows a view similar to that of FIG. 3, in which said first and second fastening means assume the form of a second embodiment, this figure also corresponding to a cross-sectional view along vertical line VI-VI of FIG. 7.
Figure 7:
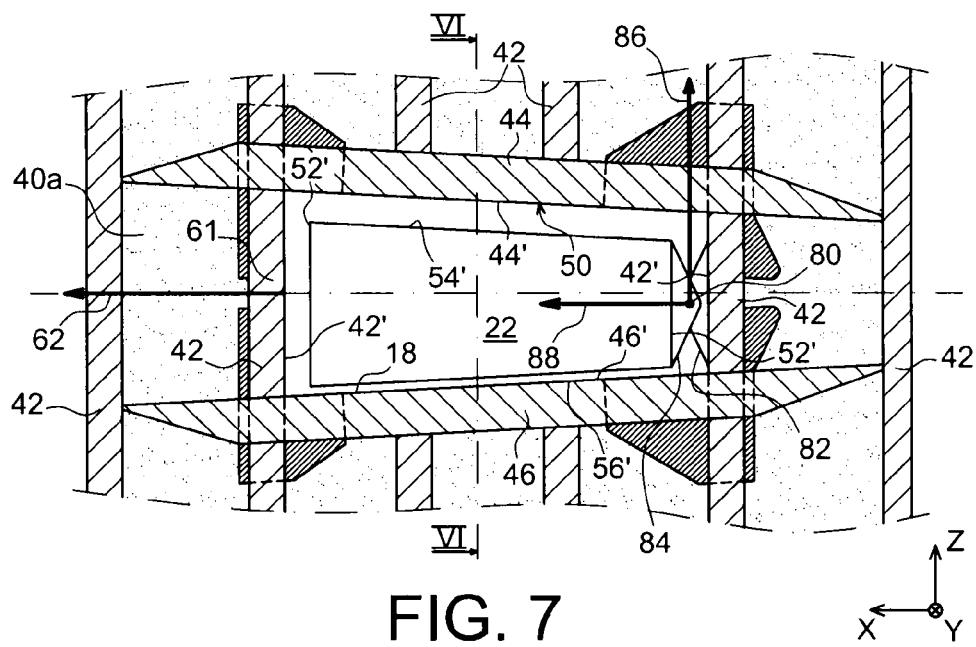
FIG. 7 shows a cross-sectional view along vertical line VII-VII of FIG. 6.
Figure 8:
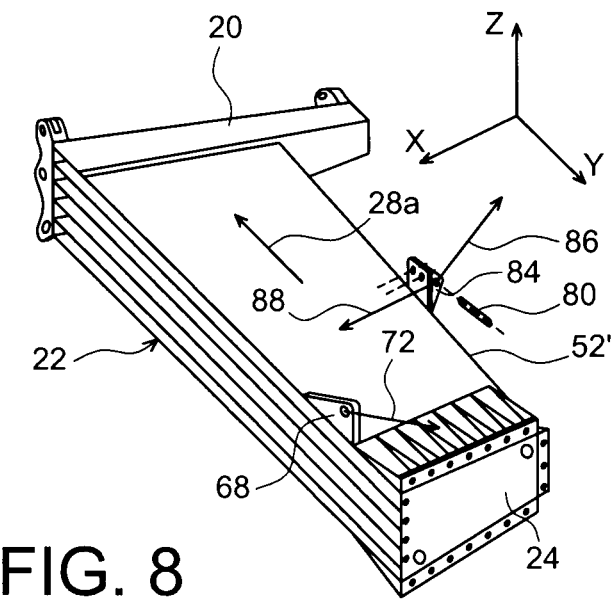
FIG. 8 is a perspective view of the first support half-structure shown in FIGS. 6 and 7.

FIGS. 6 to 8 show another preferred embodiment in which each of the first and second fastening means assumes the form of a second embodiment, the effort recovery connecting rods 66 being kept here.

Indeed, the first fastening means, which will be the only ones described since they are identical and symmetrical to the second fastening means, now comprise a hinge-type connection between the rear face 52' of the half-structure 22 and the rear face 42' of the casing. To that end, an axis 80 parallel to the direction 28a connects a yoke 82 and a fitting 84 respectively integral with opposite faces 42', 52', or vice versa. Preferably, the other faces of the half-structure 22 and the casing 50 are still without connecting means, but are still opposite in pairs.

The connection obtained ensures the recovery of the efforts along the direction orthogonal to the direction 28a, in a plane YZ, as diagrammed by arrow 86, as well as the recovery of efforts along the direction orthogonal to the direction 28a, in a plane XZ, as diagrammed by arrow 88. In other words, this connection with axis 80 makes it possible to recover efforts in the middle opening plane or in a plane parallel thereto, along two directions orthogonal to each other, preferably including direction X as shown by arrow 88.

Figure 9:
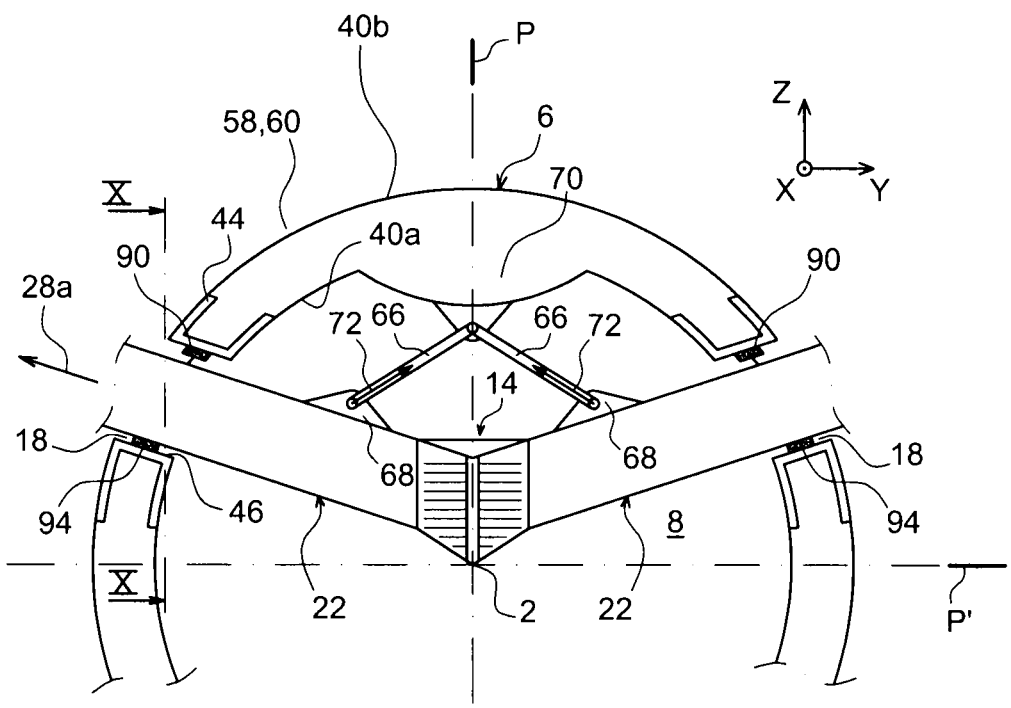
FIG. 9 shows a view similar to that of FIG. 6, in which said first and second fastening means assume the form of a third embodiment, this figure also corresponding to a cross-sectional view taken along vertical line IX-IX of FIG. 10.
Figure 10:
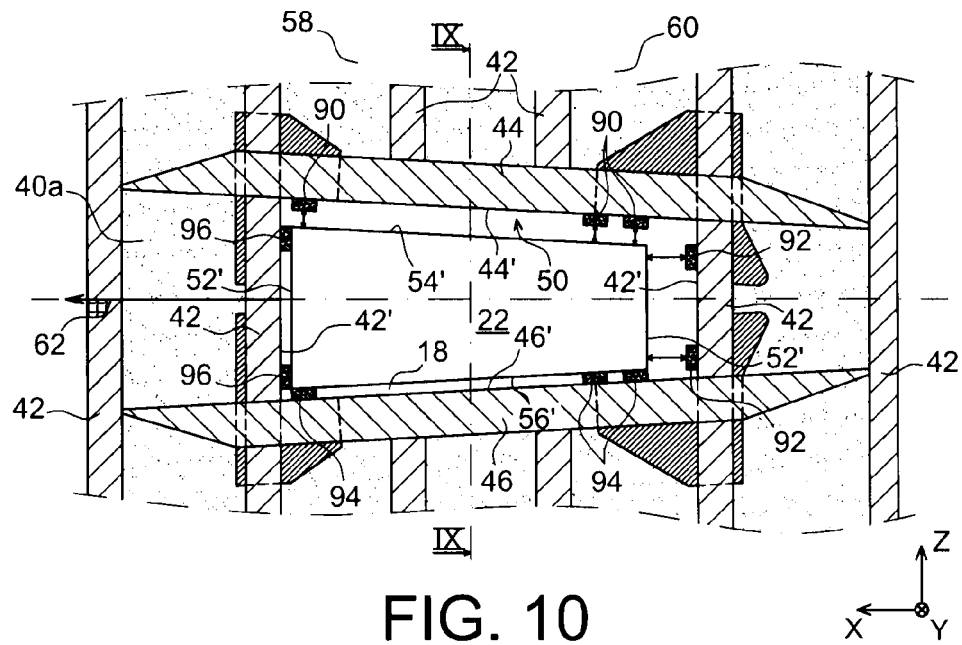
FIG. 10 shows a cross-sectional view along vertical line X-X of FIG. 9.

FIGS. 9 and 10 show another preferred embodiment in which each of the first and second fastening means assumes the form of a third embodiment, the effort recovery connecting rods 66 here also being kept.

The first and second fastening means having a substantially identical design, and being symmetrical relative to the plane P, only the first means will be described below.

In this third embodiment, the first fastening means first comprise at least one blocking element of the support structure, under compression loading while bearing on one hand on the first casing 50, and on the other hand of the support half-structure 22. In this configuration, the first fastening means are at least partially formed using blocking elements that work in compression, and no longer in traction as was the case in the traditional elements of the prior art, of the bolt type or a similar type. This results in an ease of placement of these blocking elements, because the latter can be situated entirely in the fuselage openings 18, without having to pass through the casing 50 or the support half-structure 22.

In general, each blocking element, referenced 90, 92, is under compression loading so as to exert a force on a given face of the structure, which leads the face opposite that given face, to bear with or without contact on the face of the casing opposite it. Thus, in the illustrated embodiment, blocking elements 90, 92 are provided under compression loading in two separate directions, respectively, fitting in the middle opening plane, this being sufficient to maintain the half-structure 22 relative to the casing 50 in all directions of that middle plane of the fuselage opening.

More precisely, the first fastening means comprise blocking elements 90 shown diagrammatically in FIGS. 9 and 10, these elements 90 under compression loading bearing on the upper face 54' of the half-structure, and on the upper face 44' of the casing. Thus, one or several of these elements 90 arranged in rows are provided in two or more different locations of the half-structure 22, spaced in direction X. This makes it possible to ensure the recovery of the efforts in the direction orthogonal to direction 28a, in planes YZ. In other words, these blocking elements 90 make it possible to recover efforts in the middle opening plane or in a plane parallel thereto.

Similarly, the first fastening means comprise blocking element 92 shown diagrammatically in FIG. 10, these elements 92 under compression loading bearing between the rear face 52' of the half-structure, and the rear face 42' of the casing. Thus, one or several of these elements 92 arranged in rows are provided in two or several different locations of the half-structure 22, spaced along direction Z. This makes it possible to ensure the recovery of efforts in the direction orthogonal to direction 28a, in a plane XZ. In other words, these elements 92 also make it possible to recover efforts in the middle opening plane or in a plane parallel thereto, and more preferably to recover efforts in direction X.

Here, the blocking elements 90, 92 are placed on the rear face 42' and the upper face 44', in order to press the front face 52' against the front face 42' of the casing, and in order to press the lower face 56' against the lower face 46' of the casing. Alternatively, it could be possible to place the blocking elements 90, 92 other than on the rear 42' and upper 44' faces of the casing. In fact one preferably seeks to press this half-structure 22 on two attached faces of the casing, which could therefore, according to one alternative among several, be the rear 42' and upper 44' faces, by placing the blocking elements under compression loading on the front 42' and lower 46' faces.

Each blocking element 90, 92, or row of elements, is preferably provided to form a flexible fastening, using a damping member, as will be detailed below.

Moreover, secondary damping members 94, 96 are inserted between the other two attached faces 42' 46' of the support half-structure, and the casing 50. The secondary damping members make it so no direct contact exists between the support structure and the casings, even if such direct contacts could be contemplated. When such damping members and secondary damping members are not provided, a so-called rigid assembly is then obtained between the support structure and the casings.

Nevertheless, as is the case in the illustrated embodiment, each blocking element bears on said support structure and/or on its associated casing, via a damping member. This advantageously makes it possible to procure, as mentioned above, a certain flexibility for the first and second fastening means, reducing the vibrations in the fuselage. In other words, the damping members, preferably made from an elastically deformable polymer material, e.g. of the elastomer or rubber type, advantageously make it possible to damp the vibrations, and therefore participate in insulating, from a vibration perspective, the fuselage from the engine. Here again, alternatively, other damping members of the spring type can be used.

Figure 11:
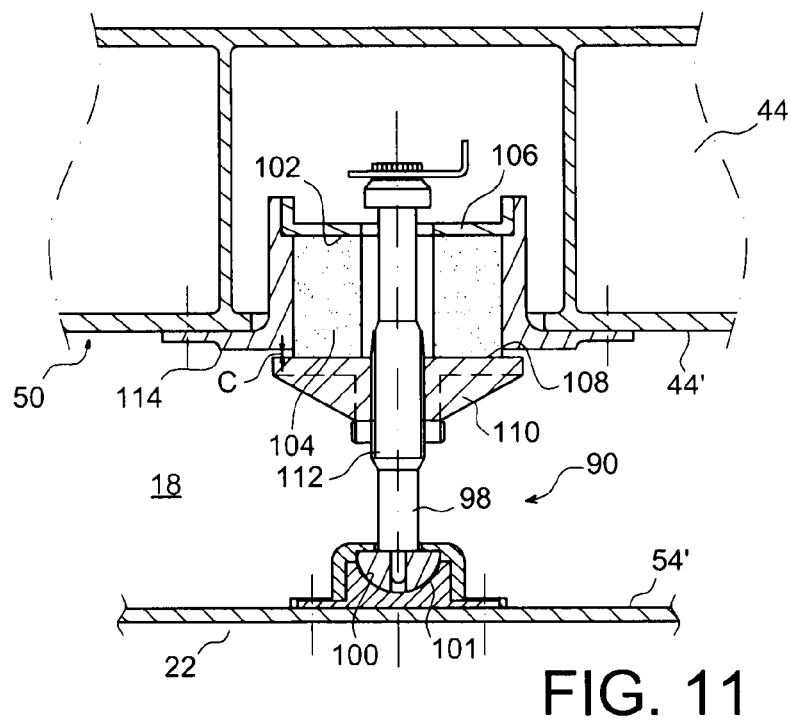
FIG. 11 shows a cross-sectional view diagramming one of the blocking elements belonging to the first fastening means shown in FIGS. 9 and 10.

FIG. 11 shows one possible embodiment for each of the blocking elements 90, 92, incorporating such a damping element.

In this figure, it is shown that the blocking element 90 comprises a member in the form of a rod 98 oriented substantially orthogonally to the faces 44', 54' it connects. The end of this rod 98 cooperating with the face 54' of the half-structure bears in a housing 100 provided on that face. This end forming a first bearing surface 101 can be curved and have a shape complementary to that of the housing 100, for better maintenance of the bearing. On the upper face 44' of the crosspiece 44, a housing 102 is provided receiving the damping member 104, in the form of an elastomer block, for example. The bottom of the housing 102 is formed by a removable nut 106 authorizing the replacement of the elastomer block 104 without having to remove the rod 98, which passes through each of the elements 104, 106 as shown in FIG. 11.

In order to apply a compression effort in the rod, the latter has another bearing surface 108 in contact with the elastomer block 104, and more precisely with the face of that block that is opposite the face resting in the bottom of the housing 102. This bearing surface 108, opposite the first bearing surface 101, can be provided on a tightening member 110 mounted screwed on a threaded portion 112 of the rod 98. This advantageously makes it possible to constitute the means for adjusting the spacing between the two bearing surfaces 101, 108, respectively bearing on the support structure and on the casing. This functionality not only makes it possible to facilitate the placement of the blocking element 90 in the opening, but also to apply a compression pre-stress to it with a desired value, while screwing the tightening member 110.

Moreover, it is preferably done so that the damping member 104 can be compressed only over a limited crushing travel C, beyond which a rigid contact between the structure and the casing prevents the crushing from continuing. This contact is for example obtained by making the bearing surface 108 abut against the surface 114 delimiting the opening of the housing 102 receiving the elastomer block 104.

Figure 12:
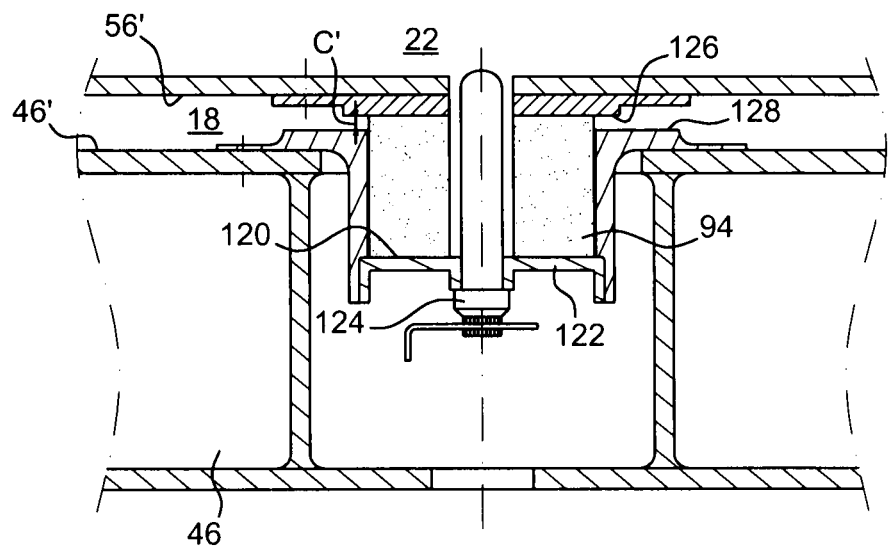
FIG. 12 shows a cross-sectional view diagramming one of the secondary damping members belonging to the first fastening means shown in FIGS. 9 and 10.

FIG. 12 illustrates one possible embodiment for each of the connections incorporating a secondary damping member 94, 96.

This figure shows that on the lower face 46' of the crosspiece 46, a housing 120 is provided receiving the secondary damping member 94, for example in the form of an elastomer block. The bottom of the housing 120 is made up of a removable nut 122 allowing easy replacement of the elastomer block 94, for example by unscrewing the nut owing to an axis 124 integral therewith.

The block 94 therefore bears in the bottom of the housing 120, as well as on a dedicated surface 126 of the face 56'. It is thereby compressed between these two bearing forces.

Moreover, it is preferably done such that the secondary damping member 94 can compress only over a limited crushing travel C', beyond which a rigid contact between the structure and the casing prevents the crushing from continuing. This contact is for example obtained by making the surface 126 abut against the surface 128 delimiting the opening of the housing 120 receiving the elastomer block 94.

As a result, it can be deduced that the first fastening means ensuring the assembly of the half-structure 22 in the casing 50 are exclusively elements under compression loading.

As mentioned above, the first and second fastening means are completed by effort recovery connecting rods 66.

Figure 13:
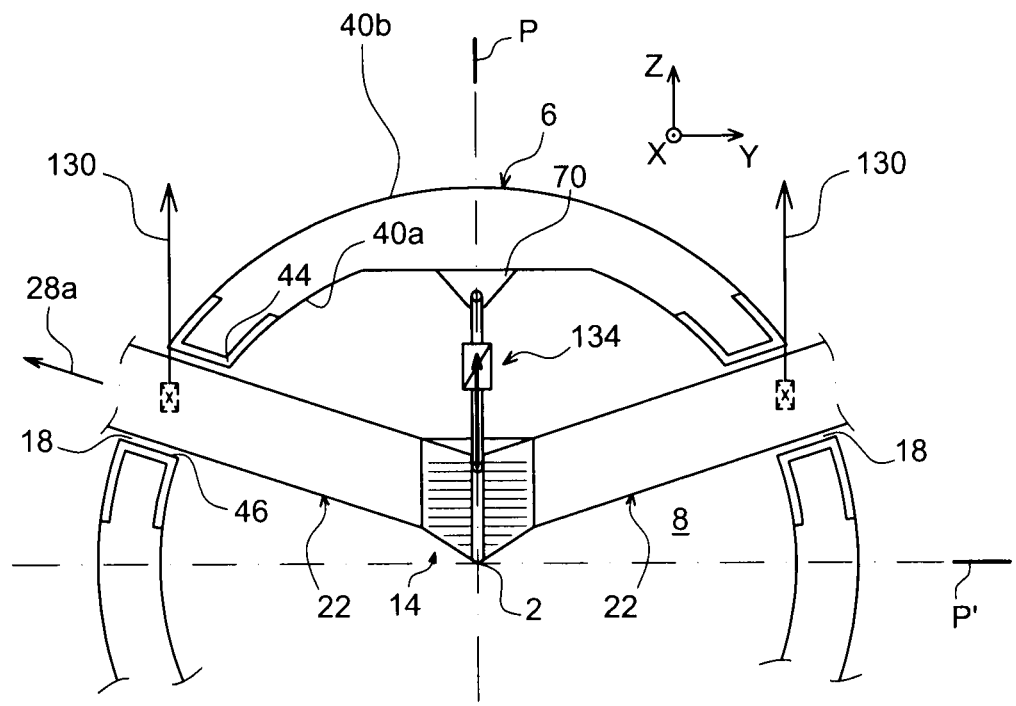
FIG. 13 shows a view similar to that of FIG. 3, in which said first and second fastening means assume the form of a fourth embodiment.
Figure 14:
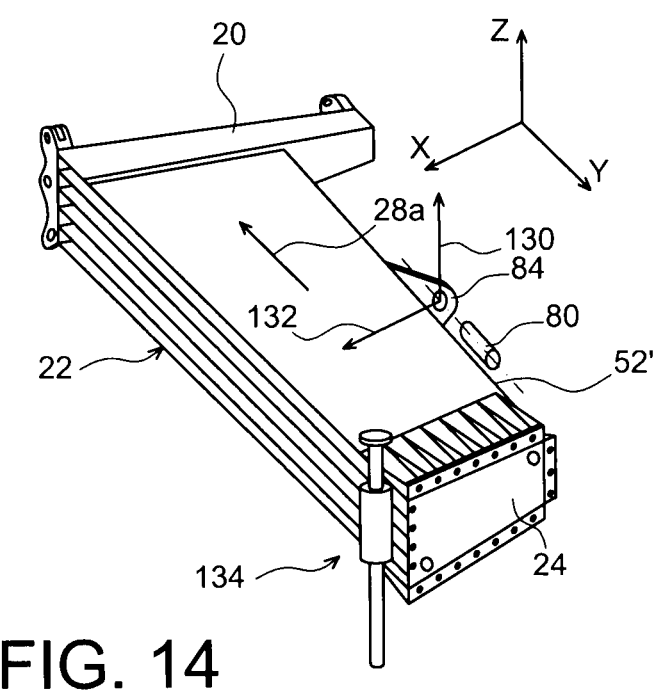
FIG. 14 is a perspective view of the first support half-structure shown in FIG. 13.

FIGS. 13 and 14 show another preferred embodiment in which each of the first and second fastening means assumes the form of a fourth embodiment, the effort recovery connecting rods no longer being kept here, but replaced with a system for modifying the incidence of the engines, called a "trim" system.

The first fastening means, like the second fastening means, here are made up of a hinge-type connection identical or similar to the one described in reference to FIGS. 6 to 8, whereof only the axis 80 and the fitting 84 are shown, the latter of course being intended to cooperate with a yoke integral with the casing. One difference lies all the same in the orientation of the axis 80, which is no longer arranged along direction 28a, orthogonal to the middle opening plane, but which is now oriented transversely, along an axis identical to the axis 80 of the second fastening means.

This hinge makes it possible to ensure recovery of the efforts along direction Z and along direction X, as shown by arrows 130, 132, respectively. The recovery of efforts along direction Y can also be contemplated, through cooperation of the yoke and the fitting housed in that yoke.

Moreover, the hinge makes it possible to make the entire support structure of the engines 14 pivot around the transverse axis of the two axes 80, and thus to control the incidence of the aircraft's engines, according to the needs identified.

To that end, an adjustment system 134 connects the fuselage and the support structure, preferably while being mounted on an upper part of the fuselage and a central part of the structure 14. This system in fact makes it possible to modify the spacing between the two elements 14, 6, along direction Z. Depending on whether this spacing is increased or decreased, it creates a pivoting of the structure 14, along the transverse axis of the axes 80, causing the front of the engines to tilt upwards or downwards, or vice versa. In the illustrated embodiment, with the adjustment system 134 situated in front relative to the axes 80, increasing the spacing causes the front of the engines to tilt downwards, while decreasing the spacing causes the front of the engines to tilt upwards.

Of course, various modifications can be made by those skilled in the art to the invention just described, solely as non-limiting examples. In that respect, it is noted that each feature described relative to a given embodiment can be applied to all of the other embodiments contemplated.

The invention claimed is:

1. A rear part of an aircraft comprising:
   a fuselage delimiting an inside space of the aircraft;
   at least two engines;
   a support structure for the engines, passing through the fuselage at first and second openings formed therein and distributed on either side of a vertical middle plane of the aircraft, the support structure having first and second opposite ends;
   each of the first and second opposite ends of the support structure protruding outwardly from the fuselage, on either side of the vertical middle plane, respectively, and supporting one of the engines,
   wherein the support structure includes first and second half-structures respectively extending through the first and second openings of the fuselage, the first and second half-structures being assembled to each other so that they can be disassembled within the inside space.

2. The rear part of an aircraft according to claim 1, wherein the first half-structure has an inner end opposite the first end, the second half-structure has an inner end opposite the second end, and the two inner ends are assembled to each other such that they can be disassembled within the inside space, via connecting means passed through by the vertical middle plane.

3. The rear part of an aircraft according to claim 2, wherein the connecting means includes bolts and/or shearing pins.

4. The rear part of an aircraft according to claim 1, wherein the first and second half-structures extend, viewed from the front, substantially along first and second directions, respectively, inclined relative to each other, so as to substantially form a V.

5. The rear part of an aircraft according to claim 4, wherein the V has the vertical middle plane as plane of symmetry.

6. The rear part of an aircraft according to claim 1, wherein the support structure is configured so that viewed from the front, for each half-structure:
   an acute angle between a horizontal middle plane of the fuselage, and a line connecting a longitudinal central axis of the fuselage and the longitudinal axis of the engine, is greater than 25°; and
   an acute angle between the direction in which the half-structure extends, and the direction normal to the fuselage at the passage of the half-structure, is smaller than 20°.

7. The rear part of an aircraft according to claim 1, wherein the first half-structure is connected to a first casing forming the first fuselage opening via first fastening means, and the second half-structure is connected to a second casing forming the second fuselage opening via second fastening means.

8. The rear part of an aircraft according to claim 7, wherein the first and second fastening means each comprises at least one flexible fastener.

9. The rear part of an aircraft according to claim 1, wherein the first and second half-structures each generally assume a form of a beam.

10. A method for assembling a rear part of an aircraft according to claim 1, comprising:
    placing the first half-structure, by moving it aiming to make it pass through the first opening of the fuselage with its inner end placed towards the front in the direction of movement;
    placing the second half-structure, by moving it aiming to make it pass through the second fuselage opening with the inner end thereof placed towards the front in the direction of movement; and
    assembling the inner end of the first half-structure on the inner end of the second half-structure.

* * * * *